United States Patent
Schricker et al.

(10) Patent No.: US 9,291,512 B2
(45) Date of Patent: Mar. 22, 2016

(54) SENSOR FOR MEASURING PRESSURE AND/OR FORCE

(75) Inventors: Alexander Schricker, Graz (AT); Andreas Mayer, Graz (AT); Dietmar Kröger, Graz (AT)

(73) Assignee: Piezocryst Advanced Sensorics GmbH, Graz (AT)

( * ) Notice: Subject to any disclaimer, the term of this patent is extended or adjusted under 35 U.S.C. 154(b) by 183 days.

(21) Appl. No.: 14/123,585

(22) PCT Filed: May 31, 2012

(86) PCT No.: PCT/EP2012/060242
§ 371 (c)(1),
(2), (4) Date: Mar. 27, 2014

(87) PCT Pub. No.: WO2012/164016
PCT Pub. Date: Dec. 6, 2012

(65) Prior Publication Data
US 2014/0216175 A1    Aug. 7, 2014

(30) Foreign Application Priority Data
Jun. 3, 2011 (AT) .................................. A 828/2011

(51) Int. Cl.
*G01L 1/04* (2006.01)
*G01L 1/16* (2006.01)
*G01L 9/00* (2006.01)
*G01L 15/00* (2006.01)

(52) U.S. Cl.
CPC . *G01L 1/16* (2013.01); *G01L 1/162* (2013.01); *G01L 9/008* (2013.01); *G01L 15/00* (2013.01)

(58) Field of Classification Search
CPC ..... G01L 1/2218; G01L 1/2231; G01L 13/24; G01L 1/14
USPC ......... 73/62.629, 862.627, 862.636, 862.625, 73/862.621, 862.381, 862
See application file for complete search history.

(56) References Cited

U.S. PATENT DOCUMENTS 4,995,014 A * 2/1991 Hoornstra ............... G01H 11/08
  367/153
5,220,836 A * 6/1993 Harms ..................... G01L 1/16
  310/338

(Continued)

FOREIGN PATENT DOCUMENTS

JP    2004226294    8/2004
JP    2004226295    8/2004

OTHER PUBLICATIONS

Matsushita. Static and Dynamic Pressure Detection Sensor, JP 2004226294.*

(Continued)

*Primary Examiner* — Lisa Caputo
*Assistant Examiner* — Nigel Plumb
(74) *Attorney, Agent, or Firm* — Dykema Gossett PLLC

(57) ABSTRACT

A sensor for measuring pressure and/or force includes at least one measuring assembly having at least one piezoelectric measuring element subjected to compressive stress for dynamic pressure and/or force measurement, and a diaphragm for introducing the pressure and/or the force onto at least the piezoelectric measuring element. The sensor also includes a further measuring assembly that is based on a different physical measuring principle for measuring static pressure and/or force.

7 Claims, 1 Drawing Sheet

(56) References Cited

U.S. PATENT DOCUMENTS

| | | | |
|---|---|---|---|
| 7,181,972 B2* | 2/2007 | Dasgupta | G01H 9/00 73/705 |
| 8,074,524 B2* | 12/2011 | Staiger | G01D 5/18 310/328 |
| 2006/0137456 A1 | 6/2006 | Dasgupta et al. | |
| 2007/0277618 A1* | 12/2007 | Kroeger | G01L 9/008 73/723 |
| 2009/0217768 A1 | 9/2009 | Staiger et al. | |
| 2010/0058875 A1* | 3/2010 | Baumgartner | G01L 9/008 73/723 |

OTHER PUBLICATIONS

English Abstract of JP 2004226294.
English Abstract of JP 2004226295.

* cited by examiner

SENSOR FOR MEASURING PRESSURE AND/OR FORCE

BACKGROUND OF THE INVENTION

1. Field of the Invention

The invention relates to a sensor for measuring pressure and/or force, comprising at least one measuring assembly having at least one piezoelectric measuring element subjected to compressive stress for dynamic pressure and/or force measurement, and a diaphragm for introducing the pressure and/or the force onto at least the piezoelectric measuring element.

2. The Prior Art

Piezoelectric pressure sensors utilize the effect that the surfaces of piezoelectric materials become electrically charged proportionally to a mechanical stress that is applied, so that subsequently a processable charge signal can be generated therefrom. Such sensors are active sensors which are well suited for dynamic measuring technology, In addition, piezoresistive pressure sensors are known which change the electrical resistance thereof under mechanical stress.

A sensor is described in US 2006137456 A, which comprises a gallium nitrite diaphragm seated on a substrate, which is etched to form a cavity. This diaphragm exhibits both a capacitive response and a plaza response to external stimuli. The sensor further comprises a circuit for measuring at least one of these responses and can be used to measure external stimuli, such as pressure, force or mechanical vibrations.

So as to allow both dynamic and static pressure measurements using only one sensor, it has been proposed in JP 2004226294 A to form electrodes on two surfaces on a substrate comprising piezoelectric material. A diaphragm comprising insulating material and a third electrode is provided on one side, and a dummy electrode is provided on the other side, wherein the substrate is bonded to the diaphragm so that the second and third electrodes are located opposite each other. In this way, the static pressure can be determined based on the capacitance between the second and third electrodes, and the dynamic pressure can be determined based on the piezoelectric effect of the substrate.

It was the object of the present invention to provide a further embodiment of a sensor for pressure or force measurement as indicated above which allows improved detection of static and dynamic effects.

So as to achieve this object, the sensor according to the invention is characterized in that a further measuring assembly based on a different physical measuring principle is provided for static pressure or force measurement. As a result, a self-test function of the sensor is possible with high precision and reliability, in addition to the simultaneous in-phase measurement of dynamic and static pressures or forces, when the dynamics drop into the range of the measuring principle for static measurements. By combining static and dynamic measurements, an in-phase signal having higher bandwidth is obtained.

A first embodiment variant of such a sensor is characterized in that at least one region of the sensor which is influenced by the pressure and/or the force is provided with a strain measuring structure for the static pressure and/or force measurement.

To this end, the strain measuring structure may be provided on a surface of at least one measuring element to which the pressure or the force is applied, wherein the measuring element is preferably operated in transversal mode.

As a further variant according to the invention for combining dynamic with static pressure and/or force measurement, the above-described sensor can also be characterized in that at least one piezoelectric element for the static pressure and/or force measurement is operated as a piezoelectric resonator subjected to compressive stress by the diaphragm.

If, according to a further embodiment, a strain measuring structure is provided in an orientation deviating from the direction of the compression, preferably normal relative to this direction, the temperature-related dimensional change can be determined from the relationship of the signals of all the strain measuring structures, and thus a temperature compensation can be carried out.

However, a temperature compensation can also be carried out according to a different embodiment of the sensor if at least one further strain measuring structure is provided in a region of the sensor not influenced by the pressure and/or the force.

BRIEF DESCRIPTION OF THE DRAWINGS

In the following description, the invention is to be described in greater detail by way of advantageous exemplary embodiments and with reference to the accompanying drawings.

DETAILED DESCRIPTION OF THE DEPICTED EMBODIMENTS

Figure 1:
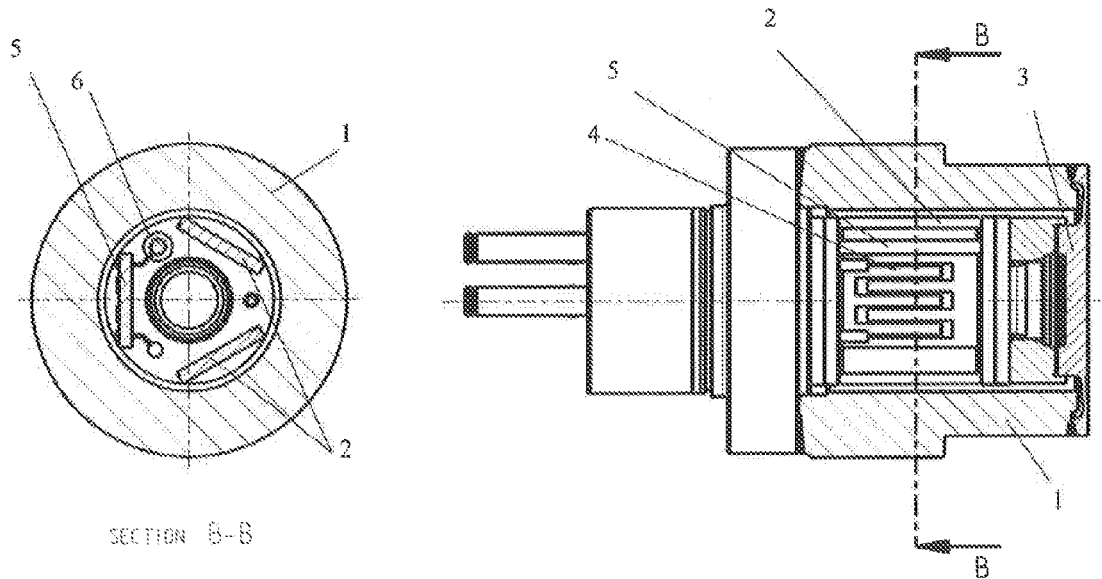
FIG. 1 shows a sensor according to the invention in one variant using static pressure measurement by way of strain gauges, wherein the left side of the illustration shows a cross-section at the height of line B-B of the right side, and wherein the right side of the illustration is a longitudinal sectional view along the plane B-B of the left side.

The sensor shown in FIG. 1 comprises two piezoelectric measuring elements 2 in a sensor housing 1, which are preferably operated in transversal mode, for dynamically measuring pressure. The piezoelectric measuring elements 2 are held in a standing manner in the sensor housing 1 and are preloaded. Force is introduced into the end faces of the measuring elements 2 by way of the diaphragm 3, wherein these elements are compressed proportionally to the applied force. This compression is utilized to generate the different measuring signals.

For a static pressure measurement according to a different physical principle, a strain measuring structure 4 is provided, which is applied to one or more additional elements 5. For example—as is shown in FIG. 1—a dielectric, and subsequently a strain measuring structure 4, are applied onto the electrode surface of one or more of the piezoelectric measuring elements 5 using thin-film technology. Because the signal for the dynamic measurement and the signal for the static measurement are thus generated by way of the same diaphragm 3, in-phase measurement of both signals is possible.

Piezo crystals 5 are selectively not used for the piezoelectric measuring function, but are used only as carriers for the strain measuring structure 4, which in this case is directly applied to the non-conductive crystal surface. These crystals 5 do not necessarily have the same angle of intersection as those that have a piezoelectric measuring function. In principle, strain measuring structures 4 could also be provided on the sensor housing 1 or any other regions, as long as these are influenced, which is to say deformed, by the pressure or the force that is to be measured.

Potential embodiments for contacting include, for example, that the strain gauges 4 are contacted using a bonding technique, or that the contacting is carried out using pads 6 on the seating surfaces, wherein then the conductors are run on the elements up to the end face and are routed to connecting wires via conductors on the seating surfaces. So as to be able to minimize the influence of the contact resistance of this contacting, the contacts may be designed to be double (4-wire connection).

Figure 2:
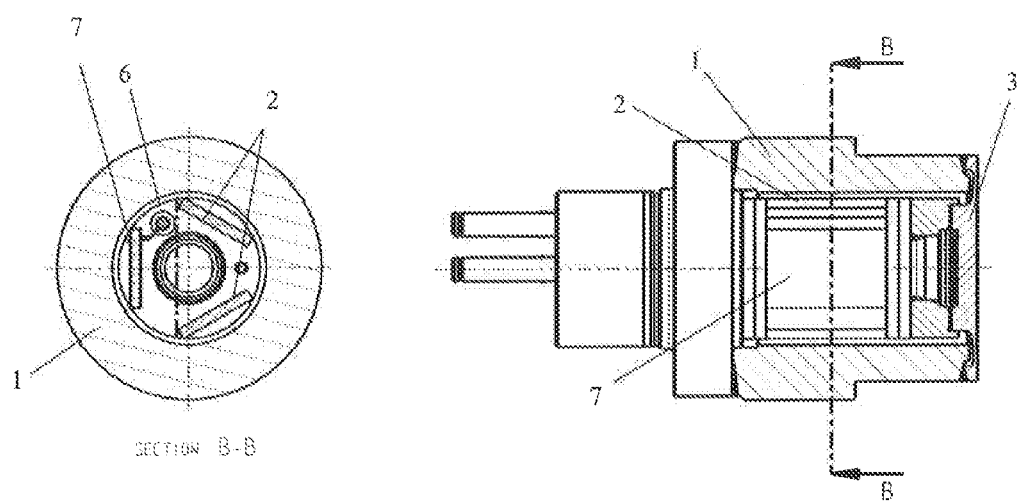
FIG. 2 shows a sensor according to the invention in a different embodiment using static pressure measurement by way of a piezoelectric resonator, wherein again the left side of the illustration shows a cross-section at the height of line B-B of the right side, and wherein the right side of the illustration is a longitudinal sectional view along the plane B-B of the left side.

However, as is shown by way of example in the sensor of FIG. 2, static pressure measurement can also be achieved by way of one or more measuring elements 7 that are operated as piezoelectric resonators (thickness shear mode resonator). The compression resulting from the force acting on the measuring elements 7 causes a shift in the resonance frequency, which is directly proportional to the applied pressure. The measuring elements 7 are excited by way of electrodes on the lateral faces of the measuring elements. These electrodes can be contacted by way of bonding or, as is the case with the transversal piezo measuring elements 2, by way of the end faces. The seating surface accordingly must have dedicated regions that are electrically insulated from each other, as is shown schematically by the dash-dotted line.

In any case, in the overlapping area of static and dynamic measurements, all of the above-described variants offer further advantageous options using suitable signal post-processing, in addition to the advantage of the above-described in-phase measurement of static and dynamic pressures and/or forces. For example, the difference of the two signals can be generated for the self-test function of the sensor. For higher accuracy of the measuring value in the overlapping area, an optionally weighted mean value of the signals could be generated, for example.

The invention claimed is:

1. A sensor for measuring pressure and/or force, comprising
    a housing having an open end,
    a diaphragm covering said open end and through which pressure and/or force is conveyed into said housing,
    a piezoelectric measuring element positioned within said housing for dynamic pressure and/or force measurement resulting from compressive stress, and
    a measuring assembly operating on a different physical measuring principle within said housing for static pressure and/or force measurement,
    said dynamic and static measurements being in phase resulting due to common pressure and/or force conditions within said housing resulting from movement of said diaphragm.

2. The sensor according to claim 1, including a strain measuring structure within said housing for measuring static pressure and/or force.

3. The sensor according to claim 1, including a measuring element operating in transversal mode within said housing and against which the pressure or the force is applied.

4. The sensor according to claim 2, wherein said piezoelectric measuring element for measuring static pressure and/or force comprises a piezoelectric resonator subjected to compressive stress by the diaphragm.

5. The sensor according to claim 2, wherein the strain measuring structure oriented within said housing to be perpendicular to a direction of compression.

6. The sensor according to claim 1, including a further strain measuring structure located in a region of the sensor which is not influenced by the pressure and/or the force.

7. The sensor according to claim 3, including a strain measuring apparatus on said measuring element.

* * * * *